United States Patent
Pancorbo Marcos et al.

(10) Patent No.: US 12,316,512 B2
(45) Date of Patent: May 27, 2025

(54) NETWORK FUNCTION SUBSCRIPTION MANAGEMENT

(71) Applicant: Telefonaktiebolaget LM Ericsson (publ), Stockholm (SE)

(72) Inventors: Maria Belen Pancorbo Marcos, Madrid (ES); Ulf Mattsson, Kungsbacka (SE); Miguel Angel Garcia Martin, Madrid (ES); Antonio Iniesta Gonzalez, Madrid (ES); Jesús Ángel De Gregorio Rodriguez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1 day.

(21) Appl. No.: 18/289,718

(22) PCT Filed: May 6, 2022

(86) PCT No.: PCT/EP2022/062268
§ 371 (c)(1),
(2) Date: Nov. 6, 2023

(87) PCT Pub. No.: WO2022/234078
PCT Pub. Date: Nov. 10, 2022

(65) Prior Publication Data
US 2024/0250883 A1    Jul. 25, 2024

(30) Foreign Application Priority Data

May 7, 2021   (EP) ..................................... 21382414

(51) Int. Cl.
G06F 15/173    (2006.01)
H04L 41/0686    (2022.01)
H04L 41/5061    (2022.01)

(52) U.S. Cl.
CPC ...... H04L 41/5064 (2013.01); H04L 41/0686 (2013.01)

(58) Field of Classification Search
None
See application file for complete search history.

(56) References Cited

U.S. PATENT DOCUMENTS

2020/0322775 A1*   10/2020   Lee .......................... H04W 8/02
2021/0014141 A1*   1/2021   Patil ..................... H04W 76/25

OTHER PUBLICATIONS

International Search Report and Written Opinion issued in International Application No. PCT/EP2022/062268 issued on Jul. 26, 2022 (10 pages).

(Continued)

*Primary Examiner* — Wing F Chan
*Assistant Examiner* — Andrew Woo
(74) *Attorney, Agent, or Firm* — Rothwell, Figg, Ernst & Manbeck, P.C.

(57) ABSTRACT

A method for event subscription management in a communications network performed by a Network Function producer (NFp) and a Network Function consumer (NFc). The method comprises establishing a subscription to an event from the NFc to the NFp and transmitting from the NFp to the NFc a notification including an indication to trigger the cancelation of the subscription. In some embodiments, the method may further comprise triggering at the NFc a subscription modification based on the received notification. In some embodiments, the subscription modification triggered at the NFc comprises at least one of cancelling or terminating the subscription with the NFp and removing the subscription context at the NFc. In some embodiments, the subscription modification triggered at the NFc comprises at least one of selecting a different NFp and establishing a new subscription to the different NFp.

21 Claims, 5 Drawing Sheets

(56) References Cited

OTHER PUBLICATIONS

3GPP TS 23.682 V16.9.0 (Mar. 2021), (135 Pages).
3GPP TS 23.228 V17.0.0 (Mar. 2021), (353 pages).
3GPP TS 29.501 V17.1.0 (Mar. 2021). (77 pages).
3GPP TS 29.520 V17.2.0 (Mar. 2021), (99 pages).
3GPP TS 29.522 V17.1.0 (Mar. 2021), (192 pages).

* cited by examiner

NETWORK FUNCTION SUBSCRIPTION MANAGEMENT

CROSS REFERENCE TO RELATED APPLICATIONS

This application is a 35 U.S.C. § 371 National Stage of International Patent Application No. PCT/EP2022/062268, filed 2022 May 6, which claims priority to European Patent Application No. 21382414.7, filed on 2021 May 7, which is incorporated by this reference.

TECHNICAL FIELD

The present invention generally relates to the service-based architecture in communications networks, and more specifically the invention relates to the management of subscribe/notify operations between Network Functions.

BACKGROUND

In the 5G Core Network, 3GPP specifies a mechanism to handle interactions between Network Functions (NF) based on the Subscribe/Notify pattern. A subscribing node (Service Consumer NF, NF consumer, NF service consumer, NFc) creates a subscription to a producer node (Service Producer NF, NF producer, NF service producer, NFp). Then, the Service Producer NF sends notifications to the Service Consumer NF.

There are currently several standard mechanisms in the 5G SBA (Service Based Architecture) framework to manage the subscriptions by the NF consumer, such as creation of the subscription, deletion of the subscription, and update of the subscription information (such as the expiry time). These mechanisms are standardized in 3GPP TS 29.501.

A problematic aspect is that when the Service Producer NF (the entity that receives subscription requests, stores the subscription context, and produces notifications to the Service Consumer NF) performs a subscription update, e.g. determines that a subscription is no longer active (e.g. it has reached the expiry date/time, or for whatever other reasons), there is no standard mechanism by which the Service Consumer NF (the entity that created the subscription) can be informed about the subscription update. This can be problem, due to the NFc which expects to be notified when an event is triggered, but such notification will never be sent due to the NFp having cancelled the subscription.

A general use case when a Service Producer NF cannot keep an existing subscription active is due to an administrative action or when the Service Producer NF is being decommissioned. Other scenarios of particular importance are related to the "Network Event Exposure" framework in 5G, (see 3GPP TS 29.520 for a description of the communication between the Network Exposure Function (NEF) and an Application Function (AF)), where an AF may have subscribed via the NEF to certain events, and the NEF has in turn subscribed to the same events at a Service Producer NF, and where no standard means exist for a Service Producer NF to inform NEF, and for NEF to inform AF, that such subscription may have been deleted by the Service Producer NF.

This is also of particular importance in network analytics scenarios (see 3GPP TS 23.288), where a Network Data Analytics Function (NWDAF) typically keeps a large number of subscriptions, acting as a producer of analytics reports. The NFs subscribed to analytic reports or events expect to receive notifications pertaining to those subscriptions. There are use cases when the NWDAF cannot maintain an existing subscription, e.g., because the UE has moved to an area outside the designated area of operation of the NWDAF. Or it may be because a user has denied previously granted permission to NWDAF for collecting input data for generation of analytic reports pertaining to the user. In all those cases the NWDAF may be forced to inactivate the existing subscription. Failing to report that NWDAF has inactivated a subscription may lead to missing notifications and leaving hung states in the consumer of analytic services NFs and, as a consequence, misbehaving network functions.

SUMMARY

An object of the invention is to improve the management of subscribe/notify operations in communications networks.

A first aspect of the invention relates to a method for event subscription management in a communications network performed by a Network Function producer (NFp). The method comprises establishing a subscription to an event from a Network Function consumer (NFc); and transmitting from the NFp to the NFc a notification including an indication to trigger the cancelation of the subscription.

In some embodiments, the notification transmitted from the NFp to the NFc further comprises an identifier of the subscription.

In some embodiments, the notification transmitted from the NFp to the NFc is further indicative of the reason of the trigger of the cancelation of the subscription.

In some embodiments, the reason comprises at least one of the unavailability of the subscription at the NFp, User Equipment mobility, administrative action, NFp being decommissioned, lack of user consent for a particular purpose, and NFp capacity constraints.

In some embodiments, the notification transmitted from the NFp to the NFc further comprises an identifier of the event to which the subscription state pertains.

In some embodiments, the notification transmitted from the NFp to the NFc further comprises an indication of a target NFp or a target set of NFp instances that support the subscription to the event.

In some embodiments, the notification transmitted from the NFp to the NFc comprises a plurality of indications of cancelation of subscriptions, each indication pertaining to a different event.

In some embodiments, each indication within the plurality of indications of cancelation of subscriptions comprises a target NFp or a target set of NFp instances that support the event pertaining to the indication.

In some embodiments, the new NFp comprises the target NFp or an NFp instance within the target set of NFp instances that support the subscription to the at least one of the different events.

In some embodiments, the NFp is an NWDAF, the notification is an analytics subscription notify message, and the event is identified by an analytic ID.

In some embodiments, the NFp or the NFc is a NEF or an AF.

A second aspect of the invention relates to a method for event subscription management in a communications network performed by a Network Function consumer (NFc). The method comprises establishing a subscription to an event from the NFc to a Network Function producer (NFp); and receiving from the NFp a notification including an indication to trigger the cancelation of the subscription.

In some embodiments, the method may further comprise triggering at the NFc a subscription modification based on the received notification.

In some embodiments, the notification received from the NFp further comprises an identifier of the subscription.

In some embodiments, the notification received from the NFp is further indicative of the reason of the trigger of the cancelation of the subscription.

In some embodiments, the reason comprises at least one of the unavailability of the subscription at the NFp, User Equipment mobility, administrative action, NFp being decommissioned, lack of user consent for a particular purpose, and NFp capacity constraints.

In some embodiments, the notification received from the NFp further comprises an identifier of the event to which the subscription state pertains.

In some embodiments, the notification received from the NFp further comprises an indication of a target NFp or a target set of NFp instances that support the subscription to the event.

In some embodiments, the subscription modification triggered at the NFc comprises at least one of cancelling or terminating the subscription with the NFp, and removing the subscription context at the NFC.

In some embodiments, the subscription modification triggered at the NFc comprises at least one of selecting a different NFp, and establishing a new subscription to the different NFp.

In some embodiments, the different NFp comprises the target NFp or an NFp instance within the target set of NFp instances that support the subscription to the event.

In some embodiments, the notification received from the NFp comprises a plurality of indications of cancelation of subscriptions, each indication pertaining to a different event.

In some embodiments, each indication within the plurality of indications of cancelation of subscriptions comprises a target NFp or a target set of NFp instances that support the event pertaining to the indication.

In some embodiments, the subscription modification triggered at the NFc comprises at least one of cancelling the subscription to at least one of the different events pertaining to the plurality of indications of cancelation of subscriptions, removing the subscription context of the at least one of the different events, and establishing a new subscription to the at least one of the different events to a new NFp.

In some embodiments, the new NFp comprises the target NFp or an NFp instance within the target set of NFp instances that support the subscription to the at least one of the different events.

In some embodiments, the NFp is an NWDAF, the notification is an analytics subscription notify message, and the event is identified by an analytic ID.

In some embodiments, the NFp or the NFc is a NEF or an AF.

Other aspects of the invention relate to communications network nodes, particularly a Network Function producer (NFp) and a Network Function consumer (NFc), each configured to perform the respective methods as described herein. Other aspects of the invention relate to computer program and computer program products.

The NFc and NFp may be any NF within a communications network.

Advantageously, the solution disclosed herein enables an improved management of subscribe/notify operations in communications networks, especially when an event is no longer available at a certain NF and the NF consumers subscribed to that event are notified of the unavailability of the event.

Further advantageously, the solution disclosed herein enables the notification of any subscription state from a NF to the NF consumers subscribed to the events exposed by said NF.

Further advantageously, the proposed solution allows a Service Consumer NF to have its subscription state synchronized with that of the Service Producer NF, be informed of a change in the state of the subscription, and if needed, delete the associated data to the subscription. The change in the state may be a cancellation, or inactive but still subscribed.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The invention may best be understood by referring to the following description and accompanying drawings that are used to illustrate particular embodiments of the invention. In the drawings.

DETAILED DESCRIPTION

The invention will now be described in detail hereinafter with reference to the accompanying drawings, in which examples of embodiments or implementations of the invention are shown. The invention may, however, be embodied or implemented in many different forms and should not be construed as limited to the embodiments set forth herein.

Rather, these embodiments are provided so that this disclosure will be thorough and complete, and will fully convey the scope of present invention to those skilled in the art. It should also be noted that these embodiments are not mutually exclusive. Components from one embodiment may be tacitly assumed to be present/used in another embodiment. These embodiments of the disclosed subject matter are presented as teaching examples and are not to be construed as limiting the scope of the disclosed subject matter.

For example, certain details of the described embodiments may be modified, omitted, or expanded upon without departing from the scope of the described subject matter.

Figure 1:
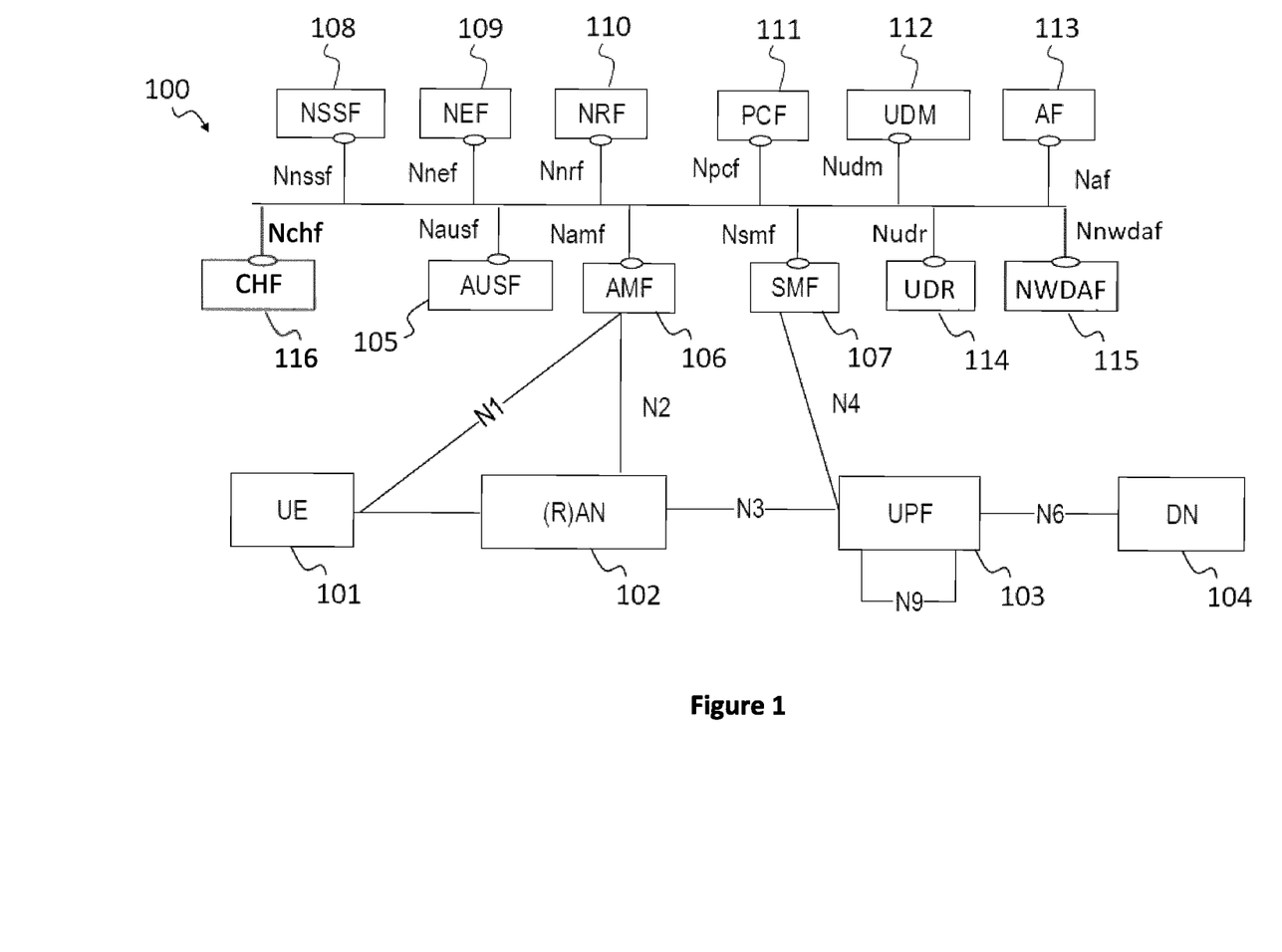
FIG. 1 is a networked system in accordance with particular embodiments of the solution described herein.

The invention described herein arise in the context of a telecommunications network, also referred to as communications network, including but not limited to a telecommunications network that conforms to and/or otherwise incorporates aspects of a fifth generation (5G) architecture. FIG. 1 is an example networked system 100 in accordance with example embodiments of the present disclosure. FIG. 1 specifically illustrates User Equipment (UE) 101, which may be in communication with a (Radio) Access Network (RAN) 102 and Access and Mobility Management Function (AMF) 106 and User Plane Function (UPF) 103. The AMF 106 may, in turn, be in communication with core network services including Session Management Function (SMF) 107 and Policy Control Function (PCF) 111. The core network services may also be in communication with an Application Server/Application Function (AS/AF) 113. Other networked services also include Network Slice Selection Function (NSSF) 108, Authentication Server Function (AUSF) 105, User Data Management (UDM) 112, Network Exposure Function (NEF) 109, Network Repository Function (NRF) 110, Network Data Analytics Function (NWDAF) 115 and Data Network (DN) 104. In some example implementations of embodiments of the present disclosure, an AMF 106, SMF 107, UPF 103, PCF 111, AUSF 105, NRF 110, UDM 112, NEF 109, AF 113, NWDAF 115, and NSSF 108 are each considered to be an NF. One or more additional instances of the network functions (NF) may be incorporated into the networked system.

The solution described herein aims to improve the management of subscribe/notify operations in communications networks.

To achieve such object, this disclosure describes a method for event subscription management in a communications network performed by a Network Function producer (NFp) and a Network Function consumer (NFc). The method comprises establishing a subscription to an event from the NFc to the NFp; and transmitting from the NFp to the NFc a notification including an indication to trigger the cancelation of the subscription.

In some embodiments, the method may further comprise triggering at the NFc a subscription modification based on the received notification.

In some embodiments, the notification transmitted from the NFp to the NFc further comprises an identifier of the subscription.

In some embodiments, the notification transmitted from the NFp to the NFc is further indicative of the reason of the trigger of the cancelation of the subscription.

In some embodiments, the reason comprises at least one of the unavailability of the subscription at the NFp, User Equipment mobility, administrative action, NFp being decommissioned, lack of user consent for a particular purpose, and NFp capacity constraints.

In some embodiments, the notification transmitted from the NFp to the NFc further comprises an identifier of the event to which the subscription state pertains.

In some embodiments, the notification transmitted from the NFp to the NFc further comprises an indication of a target NFp or a target set of NFp instances that support the subscription to the event. In some embodiments, the subscription modification triggered at the NFc comprises at least one of cancelling or terminating the subscription with the NFp, and removing the subscription context at the NFC.

In some embodiments, the subscription modification triggered at the NFc comprises at least one of selecting a different NFp, and establishing a new subscription to the different NFp.

In some embodiments, the different NFp comprises the target NFp or an NFp instance within the target set of NFp instances that support the subscription to the event.

In some embodiments, the notification transmitted from the NFp to the NFc comprises a plurality of indications of cancelation of subscriptions, each indication pertaining to a different event.

In some embodiments, each indication within the plurality of indications of cancelation of subscriptions comprises a target NFp or a target set of NFp instances that support the event pertaining to the indication.

In some embodiments, the subscription modification triggered at the NFc comprises at least one of cancelling the subscription to at least one of the different events pertaining to the plurality of indications of cancelation of subscriptions, removing the subscription context of the at least one of the different events, and establishing a new subscription to the at least one of the different events to a new NFp.

In some embodiments, the new NFp comprises the target NFp or an NFp instance within the target set of NFp instances that support the subscription to the at least one of the different events.

In some embodiments, the NFp is an NWDAF, the notification is an analytics subscription notify message, and the event is identified by an analytic ID.

In some embodiments, the NFp or the NFc is a NEF or an AF.

This disclosure also provides communications network nodes, particularly a Network Function producer, NFp, and a Network Function consumer, NFc, each configured to perform the respective methods as described herein. This disclosure also provides the corresponding computer program and computer program products comprising code, for example in the form of a computer program, that when run on processing circuitry of the communications network nodes causes the communications network nodes to perform the disclosed methods.

Advantageously, the solution disclosed herein enables an improved management of subscribe/notify operations in communications networks, especially when an event is no longer available at a certain NF and the NF consumers subscribed to that event are notified of the unavailability of the event.

Further advantageously, the solution disclosed herein enables the notification of any subscription state from a NF to the NF consumers subscribed to the events exposed by said NF.

Further advantageously, the proposed solution allows a Service Consumer NF to have its subscription state synchronized with that of the Service Producer NF, be informed of the change of state of the subscription, and if needed, delete the associated data to the subscription. The change in the state may be a cancellation, or inactive but still subscribed.

The solution proposes that in the event that a Service Producer NF needs to cancel an existing subscription, such NF sends a notification message to the affected subscriber (Service Consumer NF) indicating the current state of subscription: cancelled, removed. Other subscription states are possible, although not related to a cancellation, for example: active or inactive.

According to an embodiment, a reason parameter is added to the state of the subscription, indicating the reason for the transition to the current subscription state. Possible values include: UE mobility, administrative, decommissioned, lack of user consent, capacity problems, etc.

According to an embodiment, the NF service producer may also add a parameter including a suggested NF Id (or NF set Id) for the NF client to re-subscribe. This is because when the NF producer decides to cancel or remove a subscription, e.g. due to UE mobility or NF capacity problems, it may know the ID of other NF producer that can serve the same subscription under the new conditions of the UE (e.g., new UE location).

According to an exemplary embodiment, an NWDAF that holds a subscription for an Analytic ID related to a UE, from a consumer of analytic services NF, may need to cancel the subscription when the UE has moved outside the designated area of operation of the NWDAF, therefore, NWDAF is no longer able to collect data pertaining to that UE. In this case, the NWDAF sends a notification message to the affected consumer of analytic services, the message indicating the subscription state, and optionally, a reason parameter and the ID of the NWDAF to subscribe covering the new location.

According to an exemplary embodiment, an NWDAF that holds a subscription for a plurality of Analytic IDs related to a UE, from the same consumer of analytic services NF, may need to cancel the subscription or report that the subscription is inactive, for example due to a UE removing the consent for the NWDAF to collect user-related data. In this case, the NWDAF sends a notification message to the affected consumer of analytic services, the message indicating, for each Analytics ID that the subscription relates to, the subscription state, and optionally, a reason parameter. The consumer may unsubscribe to these Analytics IDs.

According to an exemplary embodiment, a NEF can act as both Service Consumer NF (e.g., subscribing to events produced at any other Service Producer NF, such as AMF, SMF, UDM), and Service Producer NF, providing notifications of those events towards AFs. A NEF that receives a subscription cancellation from a Service Producer NF transposes (e.g., forwards) the subscription state and possible reason parameter to the subscribed AFs.

Hereinafter, drawings showing examples of embodiments of the solution are described in detail.

Figure 2A:
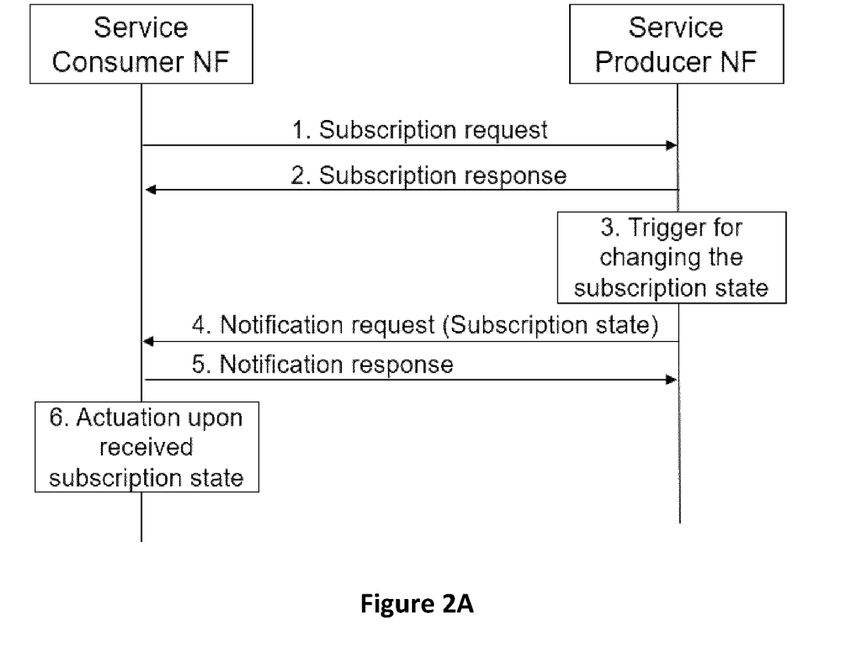
FIG. 2A is a signaling diagram illustrating a procedure according to particular embodiments of the solution described herein.
Figure 2B:
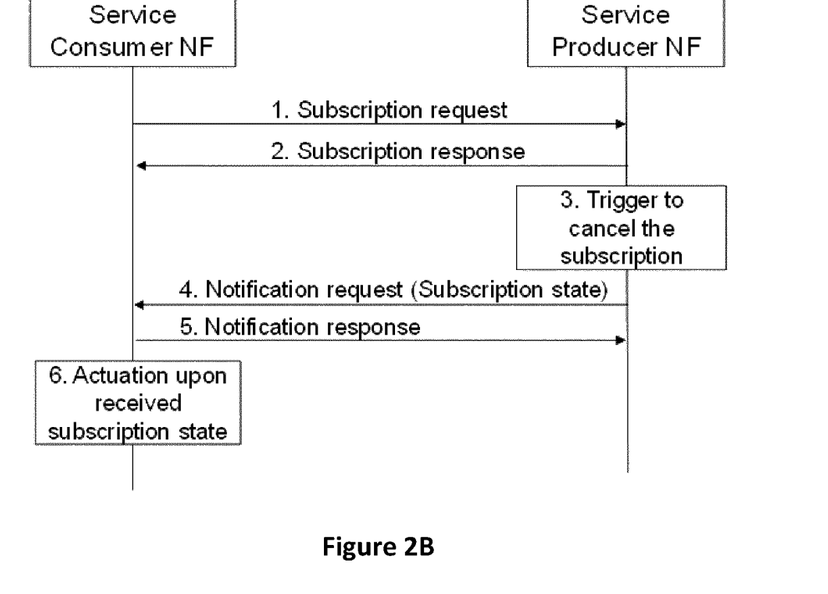
FIG. 2B is a signaling diagram illustrating a procedure according to particular embodiments of the solution described herein.

FIG. 2A and FIG. 2B are signaling diagrams illustrating a procedure for managing NF subscriptions in a communications network or communications network. The procedure is performed by a NF consumer (Service Consumer NF), and a NF producer (Service Producer NF). The Service Producer NF may be a NWDAF 115, a NEF 109, or an AF 113. The Service Consumer NF may be any NF within the communications network 100. In FIG. 2A the example is for cancellation, but it may be other state change, like to "inactive" or "active".

According to FIG. 2A, a Service Consumer NF subscribes (FIG. 2A, step 1) to one or more events at a service producer NF. Here, the term "events" is used in a wide scope and can refer to "Analytic IDs" in the context of Network Analytics received at an NWDAF. The Service producer sends a response back (FIG. 2A, step 2) indicating the successful subscription creation.

At a certain point in time the Service Producer NF receives a Trigger (FIG. 2A, step 3) for changing or modifying an existing subscription for one or more subscribed events from the Service Consumer NF. Examples of this trigger include, but are not limited to:

An administrative action taken by the operator;
An imminent shutdown or decommission of the Service Producer NF;
Inability of the Service Producer NF to continue delivering the service due to the UE moving outside the area of operation of the Service Producer NF;
Inability of the Service Producer NF to continue delivering the service due to lack of user consent for collecting user-related data.

Or more specifically, at a certain point in time the Service Producer NF receives a Trigger (FIG. 2B, step 3) for cancelling an existing subscription for one or more subscribed events from the Service Consumer NF. Examples of this trigger include, but are not limited to:

An administrative action taken by the operator;
An imminent shutdown or decommission of the Service Producer NF;
Inability of the Service Producer NF to continue delivering the service due to the UE moving outside the area of operation of the Service Producer NF;
Inability of the Service Producer NF to continue delivering the service due to lack of user consent for collecting user-related data.

The Service Producer NF sends a Notify request (FIG. 2A, step 4) to each affected subscriber, the message containing a subscription state information element indicating the current state of the subscription for the event. In case of a trigger due to a subscription cancellation, the subscription state is set to cancelled. The Notify message may also include a reason information element indicating the reason that provoke the transition of the subscription to its current state: UE mobility, administrative, lack of user consent. The Notify message may also include including a suggested NF Id (or NF set) for the NF client to re-subscribe.

The Service Consumer NF sends a Notify response (FIG. 2A, step 5) to acknowledge the reception of the previous message and acts (FIG. 2A, step 6) upon the received subscription state. In case the subscription state is cancelled, the Service Consumer NF may delete all the context and data associated to the subscription. The service consumer NF may also unsubscribe from the Service Producer NF for these events or Analytics ID(s) that are set to "cancel" or "inactive". If the Service Consumer NF does not unsubscribe from the Service Producer, when the subscription state changes again, e.g., from inactive to active state, the Service Producer NF notifies the Service Consumer NF of the change of Subscription state.

According to an embodiment, the Notify message (FIG. 2A, step 4) includes information pertaining to a plurality of events (e.g., Analytic IDs in case the Service Producer NF is an NWDAF), and for each event, a subscription state identifies the current state of the subscription.

Figure 3:
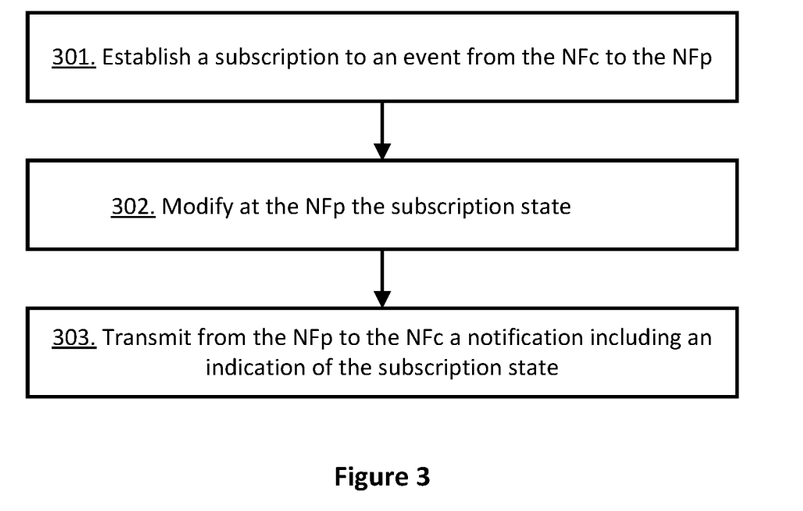
FIG. 3 is a flowchart illustrating a method performed by a communications network node according to particular embodiments of the solution described herein.

FIG. 3 is a flowchart illustrating a method performed by a Network Function producer, NFp.

At step 301, the NFp establishes a subscription to an event from the NFc to the NFp.

At step 302, the NFp modifies at the NFp the subscription state.

At step 303, the NFp transmits from the NFp to the NFc a notification including an indication of the subscription state.

Figure 4:
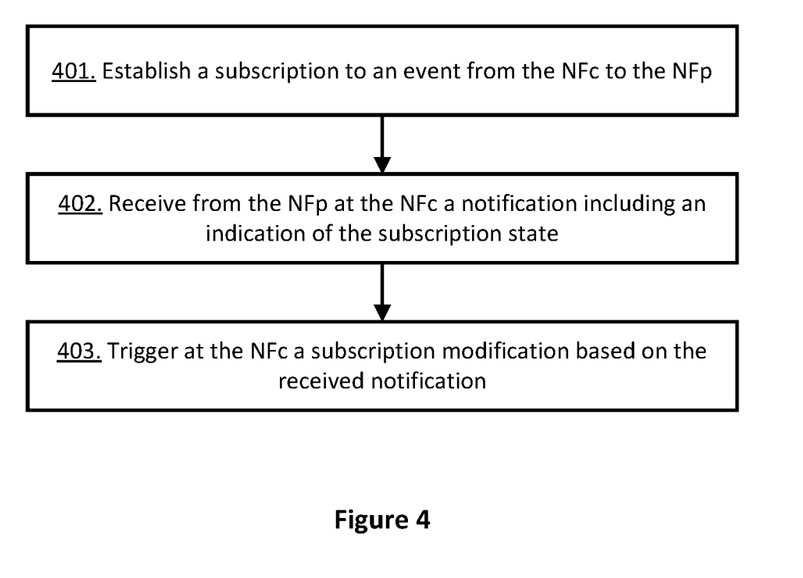
FIG. 4 is a flowchart illustrating a method performed by a communications network node according to particular embodiments of the solution described herein.

FIG. 4 is a flowchart illustrating a method performed by a Network Function consumer, NFc.

At step 401, the NFc establishes a subscription to an event from the NFc to the NFp.

At step 402, the NFc receives from the NFp at the NFc a notification including an indication of the subscription state.

At step 403, the NFc triggers at the NFc a subscription modification based on the received notification.

Figure 5:
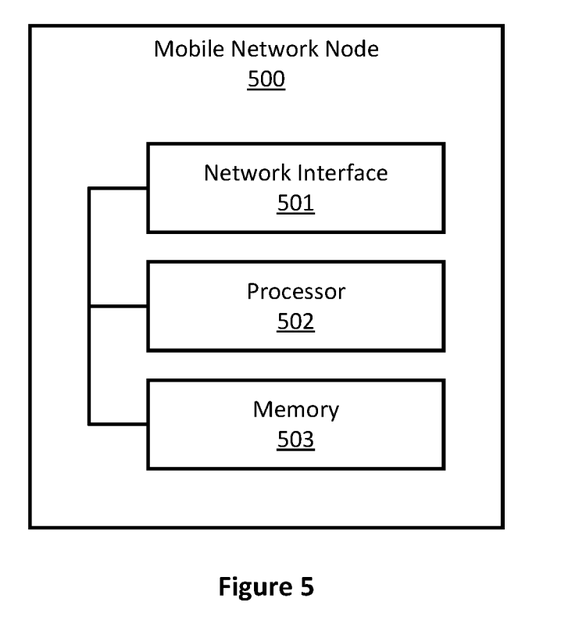
FIG. 5 is a block diagram of a communications network node configured in accordance with particular embodiments of the solution described herein.

FIG. 5 is a block diagram illustrating elements of a communications network node, a Network Function producer, NFp, of a communications network. In some embodiments, the communications network node 500 may be any NF. As shown, the communications network node may include network interface circuitry 501 (also referred to as a network interface) configured to provide communications with other nodes of the core network and/or the network. The communications network node may also include a processing circuitry 502 (also referred to as a processor) coupled to the network interface circuitry, and memory circuitry 503 (also referred to as memory) coupled to the processing circuitry. The memory circuitry 503 may include computer readable program code that when executed by the processing circuitry 502 causes the processing circuitry to perform operations according to embodiments disclosed herein. According to other embodiments, processing circuitry 502 may be defined to include memory so that a separate memory circuitry is not required. As discussed herein, operations of the communications network node may be performed by processing circuitry 502 and/or network interface circuitry 501. For example, processing circuitry 502 may control network interface circuitry 501 to transmit communications through network interface circuitry 501 to one or more other network nodes and/or to receive communications through network interface circuitry from one or more other network nodes. Moreover, modules may be stored in memory 503, and these modules may provide instructions so that when instructions of a module are executed by processing circuitry 502, processing circuitry 502 performs respective operations (e.g., operations discussed below with respect to Example Embodiments relating to core network nodes).

Figure 6:
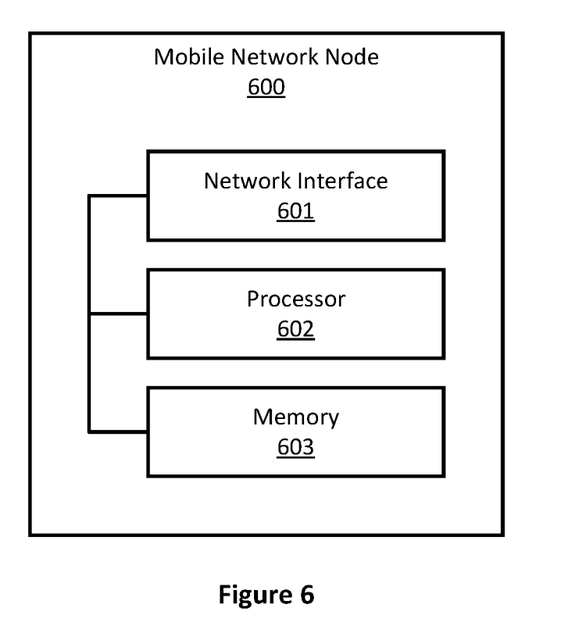
FIG. 6 is a block diagram of a communications network node configured in accordance with particular embodiments of the solution described herein.

FIG. 6 is a block diagram illustrating elements of a communications network node, a Network Function consumer, NFc, of a communications network. In some embodiments, the communications network node 600 may be any NF. As shown, the communications network node may include network interface circuitry 601 (also referred to as a network interface) configured to provide communications with other nodes of the core network and/or the network. The communications network node may also include a processing circuitry 602 (also referred to as a processor) coupled to the network interface circuitry, and memory circuitry 603 (also referred to as memory) coupled to the processing circuitry. The memory circuitry 603 may include computer readable program code that when executed by the processing circuitry 602 causes the processing circuitry to perform operations according to embodiments disclosed herein. According to other embodiments, processing circuitry 602 may be defined to include memory so that a separate memory circuitry is not required. As discussed herein, operations of the communications network node may be performed by processing circuitry 602 and/or network interface circuitry 601. For example, processing circuitry 602 may control network interface circuitry 601 to transmit communications through network interface circuitry 601 to one or more other network nodes and/or to receive communications through network interface circuitry from one or more other network nodes.

Moreover, modules may be stored in memory 603, and these modules may provide instructions so that when instructions of a module are executed by processing circuitry 602, processing circuitry 602 performs respective operations (e.g., operations discussed below with respect to Example Embodiments relating to core network nodes).

Figure 7:
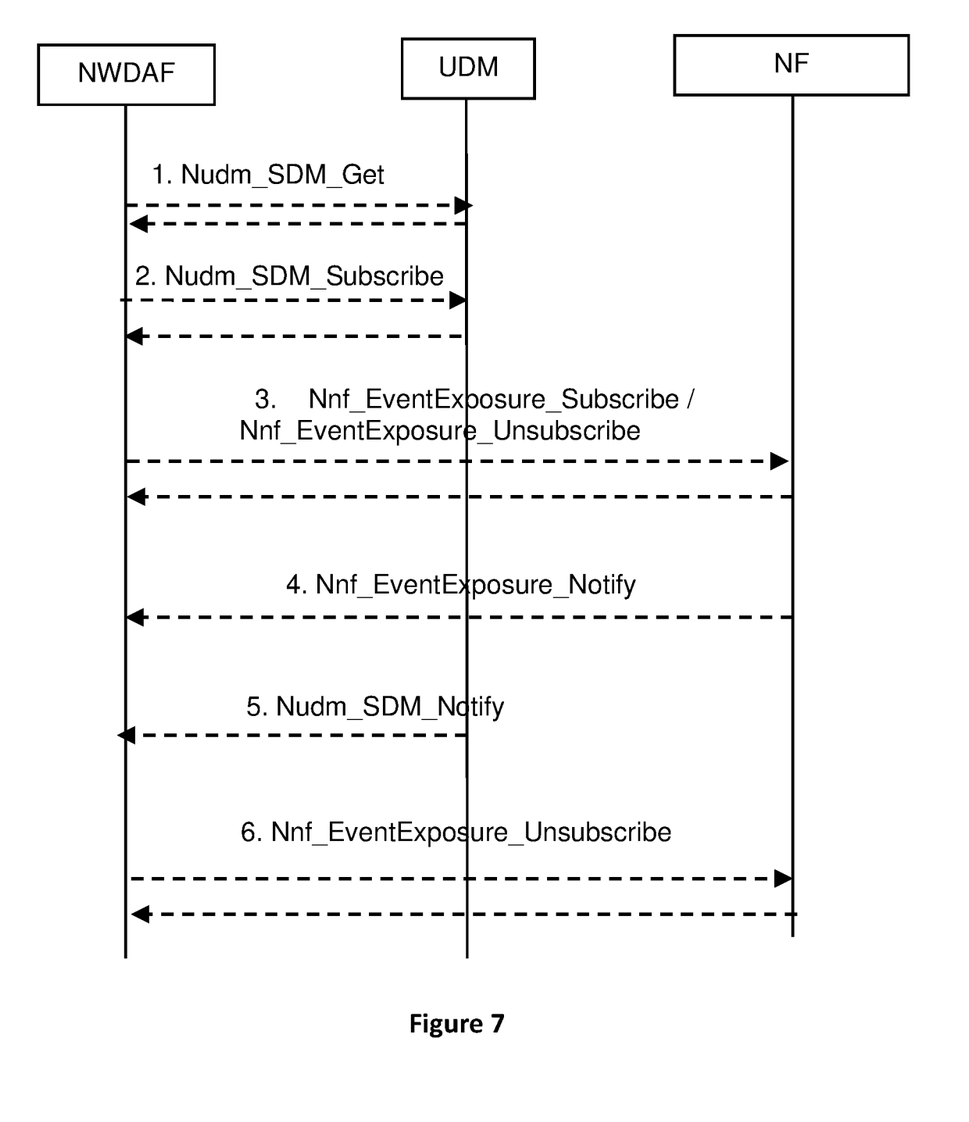
FIG. 7 is a flowchart illustrating a method performed by a communications network node according to particular embodiments of the solution described herein.

FIG. 7 is a flowchart illustrating a method performed by a NWDAF 115, a UDM 112 and a NF of the networked system 100. In some embodiments the UDM is a Network Function producer (NFp). In some embodiments, the NWDAF is a Network Function consumer (NFc).

The method shown in FIG. 7 relates to the user consent to data collection, a functionality comprising support of tracking the distribution and usage of any user related information that may be subject to user consent. The data collection is for the purpose of analytics or model training in the NWDAF, so NFs track the distribution of analytics that are subject to user consent and informs the consumer (NWDAF) if user consent is revoked.

Then, the NWDAF checks user consent with UDM before data collection, stores the consumers of analytics, unsubscribes to data collection when the user consent validity time expires, or the user consent is revoked, and may inform the consumers of analytics that no more reporting will be performed, if NWDAF cannot report any longer.

The AnalyticsId that collect subscriber data may be extended to check user consent with UDM prior to collect subscriber data.

If user consent is granted the NWDAF may collect input data, generate analytics and store it in the consumers.

At the time the user consent is revoked or the validity time expires the NWDAF may unsubscribe to collection of subscriber data.

If the NWDAF cannot provide analytics to consumers due to lack of input data then it may report this to the consumers.

Any Analytics ID on UE related analytics may be used to check user consent.

The Data Collection may be subject of user consent bound to a purpose, such as analytics or model training, and may be associated with a validity time. The user consent is subscription information stored in the UDM, that includes:
  a) whether the user authorizes the collection of its data for a particular purpose;
  b) the purpose for data collection, e.g., analytics or model training;
  c) the time when the user consent expires, if any.

The NWDAF retrieves the user consent to data collection from UDM for a user, i.e. SUPI or GPSI prior to collecting user data from an NF or the AF via NEF using Nudm_SDM service for Subscription data type "User consent for data collection".

When Data is collected from the UE Application, the ASP is responsible to obtain user consent to share data with the MNO. If the ASP obtains the user consent, then configures the UE Application to communicate with the AF.

The user consent validity time may expire or UDM notifies that the user consent is removed or updated for a particular purpose then NWDAF stops data collection and may remove the stored data and may stop providing analytics to consumers. The NWDAF may also indicate to the consumers that the subscription to an Analytics Id is not active any longer, and the consumer may decide to unsubscribe.

The NWDAF can provide analytics using trained models even if the user consent is revoked.

The AnalyticsId that needs to check user consent before collecting input data are those that collected per user input data, i.e. per SUPI, GPSI, Internal or External Group Id.

The procedure in FIG. 7 (procedure for Data Collection from NFs) is used by NWDAF to subscribe/unsubscribe at NFs in order to be notified for data collection on a related event (s), using Event Exposure Services. User consent to data collection may be required. The steps in FIG. 7 are the following:

In step 1, the NWDAF checks if data is to be collected for a user, i.e. SUPI or GPSI, then retrieves the user consent from UDM using Nudm_SDM_Get including data type "User consent for data collection", SUPI or GPSI. The UDM provides the user consent per purpose of data collection. If the user consent, for the purpose of data collection, is not granted, the NWDAF do not subscribe to event exposure for events related to this user and the data collection stops here.

In step 2, if the user consent, for the purpose of data collection, is granted, the NWDAF subscribes to UDM to notifications of changes on subscription data type "User consent for data collection" for this user using Nudm_SDM_Subscribe.

In step 3, the NWDAF subscribes to or cancels subscription for a (set of) Event ID(s) by invoking the Nnf_EventExposure_Subscribe/Nnf_EventExposure_Unsubscribe service operation.

In step 4, if NWDAF subscribes to a (set of) Event ID(s), the NFs notify the NWDAF (e.g. with the event report) by invoking Nnf_EventExposure_Notify service operation according to Event Reporting Information in the subscription.

When the Reporting type is provided at step 1, the NWDAF determines that the events are disappeared, if the same events are included in the notification compared to the previous notification. Otherwise, NWDAF determines the events are newly appeared or changed. Also, the NWDAF restores the events that are not included in the notification but included in the previous notification.

If the Granularity of dynamics is applied to the subscription, the NWDAF shall infer the events in the NF from the events in the previous notification with the applied Granularity of dynamics.

This procedure is also used when the NWDAF subscribes for data from a trusted AF.

In step 5, the UDM may notify the NWDAF that user consent for a given purpose is no longer granted, this step may happen at any time after step 1.

In step 6, if user consent for a given purpose is no longer granted/revoked for a UE for which data has been collected, the NWDAF shall unsubscribe to any Event ID to collect data for that SUPI or GPSI. The NWDAF may remove the stored data for this user.

The NWDAF checks user consent for the UE with UDM prior to data collection. The NWDAF may report to any consumer with subscriptions to any of the UE related analytics listed above that the subscription is not active, e.g., due to lack of user consent to collect input data.

The invention claimed is:

1. A method for event subscription management in a communications network performed by a service provider network function (NFp), wherein the service provide network function (NFp) is a Network Data Analytics Function (NWDAF), the method comprising:

the service provider network function (NFp) receiving from a Network Function consumer (NFc) a subscription request for establishing a subscription to an event; and the service provider network function (NFp) transmitting to the Network Function consumer (NFc) a notification including an indication to trigger a cancelation of the subscription, wherein the notification transmitted from the NFp to the NFc comprises information indicative of a reason of the trigger of the cancelation of the subscription.

2. The method of claim 1, wherein the notification transmitted from the NFp to the NFc further comprises an identifier of the subscription.

3. The method of claim 1, wherein the reason comprises at least one of the unavailability of the subscription at the NFp, User Equipment mobility, administrative action, NFp being decommissioned, lack of user consent for a particular purpose, and NFp capacity constraints.

4. The method of claim 1, wherein the notification transmitted from the NFp to the NFc further comprises at least one of an identifier of the event to which the subscription state pertains,
an indication of a target NFp or a target set of NFp instances that support the subscription to the event, and
a plurality of indications of cancelation of subscriptions, each of the respective indications pertaining to a different event.

5. The method of claim 4, wherein each one of the respective indications included in the plurality of indications of cancelation of subscriptions comprises a respective target NFp or a target set of NFp instances that support the event pertaining to the respective indication.

6. The method of claim 1, wherein the transmitted notification is an analytics subscription notify message, and the event is identified by an analytic ID, and/or
wherein the NFc is a network exposure function (NEF) or an application function (AF).

7. The method of claim 1, wherein
the method further comprises, prior to the NFp transmitting the notification to the NFc, the NFp receives a trigger for cancelling the subscription, and
the NFp transmits the notification to the NFc in response to receiving the trigger for cancelling the subscription.

8. An apparatus for event subscription management in a communications network, the apparatus comprising:
a processor; and
a memory, the memory containing instructions executable by the processor, wherein the apparatus is operative to perform the method of claim 1.

9. A method for event subscription management in a communications network performed by a Network Function consumer (NFc), the method comprising:
the NFc transmitting to a service provider network function (NFp) a subscription request for establishing a subscription to an event, wherein the service provider network function (NFp) is a Network Data Analytics Function (NWDAF); and
the NFc receiving from the service provider network function (NFp) a notification including an indication to trigger the cancelation of the subscription, wherein
the notification comprises information indicative of a reason of the trigger of the cancelation of the subscription.

10. The method of claim 9, wherein
the received notification is an analytics subscription notify message, and the event is identified by an analytic ID, and/or
the NFc is a network exposure function (NEF) or an application function (AF).

11. The method of claim 9, further comprising triggering at the NFc a subscription modification based on the received notification.

12. The method of claim 11, wherein the subscription modification triggered at the NFc comprises at least one of cancelling or terminating the subscription with the NFp, and removing the subscription context at the NFc.

13. The method of claim 11, wherein the subscription modification triggered at the NFc comprises at least one of selecting a different NFp, and establishing a new subscription to the different NFp.

14. The method of claim 13, wherein the selected different NFp comprises a target NFp or an NFp instance within a target set of NFp instances that support the new subscription to the event.

15. The method of claim 11, wherein the subscription modification triggered at the NFc comprises at least one of cancelling the subscription to at least one of the different events pertaining to the plurality of indications of cancelation of subscriptions, removing the subscription context of the at least one of the different events, and establishing a new subscription to the at least one of the different events to a new NFp.

16. The method of claim 9, wherein the received notification further comprises an identifier of the subscription.

17. The method of claim 9, wherein the reason comprises at least one of the unavailability of the subscription at the NFp, User Equipment mobility, administrative action, NFp being decommissioned, lack of user consent for a particular purpose, and NFp capacity constraints.

18. The method of claim 9, wherein
the notification further comprises at least one of: an identifier of the event to which the subscription state pertains, an indication of a target NFp or a target set of NFp instances that support the subscription to the event, and a plurality of indications of cancelation of subscriptions, each indication pertaining to a different event.

19. The method of claim 9, wherein the notification comprises a plurality of indications of cancelation of subscriptions, each one of the respective indications included in the plurality of indications pertaining to a different event.

20. The method of claim 19, wherein each one of the respective indications included in the plurality of indications of cancelation of subscriptions comprises a target NFp or a target set of NFp instances that support the event pertaining to the respective indication.

21. An apparatus for event subscription management in a communications network, the apparatus comprising:
a processor; and
a memory, the memory containing instructions executable by the processor, wherein the apparatus is operative to perform the method of claim 9.

* * * * *